(12) United States Patent　　　(10) Patent No.:　US 12,695,352 B2
Kee et al.　　　　　　　　　　　　(45) Date of Patent:　　　Jul. 28, 2026

(54) ELECTRIC MOTOR OIL PUMP WITH INTEGRATED BEARING SUPPORT

(71) Applicant: Schaeffler Technologies AG & Co. KG, Herzogenaurach (DE)

(72) Inventors: Noah Kee, Rittman, OH (US); Matthew Payne, Glenmont, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 240 days.

(21) Appl. No.: 18/740,850

(22) Filed: Jun. 12, 2024

(65) Prior Publication Data

US 2025/0385564 A1　　Dec. 18, 2025

(51) Int. Cl.
| | |
|---|---|
| *H02K 5/16* | (2006.01) |
| *F16C 19/26* | (2006.01) |
| *H02K 7/08* | (2006.01) |
| *H02K 9/193* | (2006.01) |
| *H02K 24/00* | (2006.01) |

(52) U.S. Cl.
CPC ............. *H02K 5/163* (2013.01); *F16C 19/26* (2013.01); *H02K 7/085* (2013.01); *H02K 9/193* (2013.01); *H02K 24/00* (2013.01); *F16C 2380/26* (2013.01)

(58) Field of Classification Search
CPC ........ H02K 5/163; H02K 7/085; H02K 9/193; H02K 24/00; F16C 19/26; F16C 2380/26
See application file for complete search history.

(56) References Cited

U.S. PATENT DOCUMENTS

| | | | |
|---|---|---|---|
| 6,612,657 B1 * | 9/2003 | Fakhoury | B60B 27/02 301/105.1 |
| 7,632,020 B2 * | 12/2009 | Niebling | F16C 33/7886 384/486 |
| 10,052,912 B2 * | 8/2018 | Duch | F16C 33/80 |
| 2005/0111771 A1 * | 5/2005 | Shevket | F16C 19/497 384/494 |

* cited by examiner

*Primary Examiner* — Tulsidas C Patel
*Assistant Examiner* — Mohammed Ahmed Qureshi
(74) *Attorney, Agent, or Firm* — Suiter Swantz IP

(57) ABSTRACT

A bearing carrier may include a hub defining a bearing surface. A rotating assembly may include the bearing carrier and a bearing coupled to the bearing surface. The bearing carrier may also include an annular lip extending from a flange of the hub. The rotating assembly may also include a pump coupler coupled to the annular lip of the bearing carrier. A generator may include the rotating assembly and an oil-pump coupled to the oil-pump coupler. The rotating assembly may also include an electromagnetic rotor. The generator may include an electromagnetic stator which generates electricity in response to a magnetic field induced by the electromagnetic rotor of the rotating assembly.

20 Claims, 12 Drawing Sheets

100

100

100

100

100

100

200

200

200

200

300

200

300

ELECTRIC MOTOR OIL PUMP WITH INTEGRATED BEARING SUPPORT

TECHNICAL FIELD

The present disclosure generally relates to couplings for transmitting rotation, and, more particularly, to couplings for transmitting rotation within electric motors.

BACKGROUND

Oil pumps, pickup tubes, resolvers, and bearings of electric motors are components that occupy same space within the electric motors. Packaging the oil pumps, resolvers, and bearings within the electric motors is difficult due to a radial envelope of the electric motors. The electric motors may include oil pumps which are mounted off-center to avoid packaging conflicts with the pickup tubes, resolvers, and bearings. The off-center mounting may require additional components for taking-off power from the electric motor. Therefore, it would be advantageous to provide a device, system, and method that cures the shortcomings described above.

SUMMARY

A bearing carrier is described, in accordance with one or more embodiments of the present disclosure. The bearing carrier may include: a rim; a hub, wherein the hub is disposed radially inwards of and axially extends from the rim, wherein an inner radius of the hub defines a bearing surface, wherein the bearing surface is coincident to a central axis of the bearing carrier; a flange, wherein the flange extends from the hub, wherein the hub is axially disposed between the rim and the flange, wherein the flange defines a centered through hole, wherein the centered through hole is coincident with the central axis; an external annular lip, wherein the external annular lip axially extends from the rim away from the hub and the flange, wherein the external annular lip is disposed radially outwards of the hub and the flange, wherein the external annular lip is coincident with the central axis; and an internal annular lip, wherein the internal annular lip axially extends from the flange towards the rim, wherein the internal annular lip is disposed radially inwards of the hub, wherein the internal annular lip is disposed radially outwards of the centered through hole, wherein the internal annular lip is coincident with the central axis.

In some aspects, the flange is parallel to the rim.

In some aspects, the hub is cylindrical, wherein the hub is orthogonal to the rim, wherein the flange is orthogonal to the hub.

In some aspects, the centered through hole is a radially inwards-most portion of the bearing carrier, wherein the rim is a radially outwards-most portion of the bearing carrier.

In some aspects, the flange and the external annular lip are axially outer-most portions of the bearing carrier.

In some aspects, the bearing surface is axially disposed between the flange and the rim.

In some aspects, the bearing surface is axially disposed between the internal annular lip and the rim.

In some aspects, the external annular lip defines an access hole through the external annular lip and the rim up to the bearing surface.

In some aspects, the access hole and the bearing surface jointly form one of a counterbore hole or a countersink hole.

In some aspects, the flange defines a plurality of offset through holes, wherein the plurality of offset through holes are disposed radially outwards of the centered through hole.

In some aspects, the plurality of offset through holes are disposed radially outwards of the internal annular lip.

In some aspects, the bearing surface is disposed radially outwards of the internal annular lip, the centered through hole, and the plurality of offset through holes.

In some aspects, the plurality of offset through holes are arranged in a planar array about the central axis.

In some aspects, the plurality of offset through holes are smaller than the centered through hole.

In some aspects, the external annular lip defines one or more slots.

A rotating assembly is described, in accordance with one or more embodiments of the present disclosure. The rotating assembly may include: a bearing carrier including: a rim; a hub, wherein the hub is disposed radially inwards of and axially extends from the rim, wherein an inner radius of the hub defines a bearing surface, wherein the bearing surface is coincident to a central axis of the bearing carrier; a flange, wherein the flange extends from the hub, wherein the hub is axially disposed between the rim and the flange, wherein the flange defines a centered through hole, wherein the centered through hole is coincident with the central axis; an external annular lip, wherein the external annular lip axially extends from the rim away from the hub and the flange, wherein the external annular lip is disposed radially outwards of the hub and the flange, wherein the external annular lip is coincident with the central axis; and an internal annular lip, wherein the internal annular lip axially extends from the flange towards the rim, wherein the internal annular lip is disposed radially inwards of the hub, wherein the internal annular lip is disposed radially outwards of the centered through hole, wherein the internal annular lip is coincident with the central axis; a bearing, wherein the bearing is disposed radially inwards of and coupled to the bearing surface; a resolver rotor, wherein the resolver rotor is disposed radially outwards of and coupled to the external annular lip; a pump coupler, wherein the pump coupler is disposed radially inwards of and coupled to the internal annular lip; a shaft; an electromagnetic rotor; and a rotor carrier, wherein the rim and the shaft are coupled to opposing axial ends of the rotor carrier, wherein the electromagnetic rotor is disposed radially outwards of and coupled to the rotor carrier between the rim and the shaft.

In some aspects, the bearing is one of a cylindrical bearing, a taper roller bearing, a needle bearing, a ball bearing, or a plain bearing.

In some aspects, at least the bearing carrier, the resolver rotor, the pump coupler, the shaft, the electromagnetic rotor, and the rotor carrier form a rigid body.

In some aspects, the resolver rotor is disposed axially outwards of the rotor carrier.

An electric motor is described, in accordance with one or more embodiments of the present disclosure. The electric motor may include: a rotating assembly including: a bearing carrier including: a rim; a hub, wherein the hub is disposed radially inwards of and axially extends from the rim, wherein an inner radius of the hub defines a bearing surface, wherein the bearing surface is coincident to a central axis of the bearing carrier; a flange, wherein the flange extends from the hub, wherein the hub is axially disposed between the rim and the flange, wherein the flange defines a centered through hole, wherein the centered through hole is coincident with the central axis; an external annular lip, wherein the external annular lip axially extends from the rim away from the hub and the flange, wherein the external annular lip is disposed radially outwards of the hub and the flange, wherein the external annular lip is coincident with the central axis; and an internal annular lip, wherein the internal annular lip axially extends from the flange towards the rim, wherein the internal annular lip is disposed radially inwards of the hub, wherein the internal annular lip is disposed radially outwards of the centered through hole, wherein the internal annular lip is coincident with the central axis; a bearing, wherein the bearing is disposed radially inwards of and coupled to the bearing surface; a resolver rotor, wherein the resolver rotor is disposed radially outwards of and coupled to the external annular lip; a pump coupler, wherein the pump coupler is disposed radially inwards of and coupled to the internal annular lip; a shaft; an electromagnetic rotor; and a rotor carrier, wherein the rim and the shaft are coupled to opposing axial ends of the rotor carrier, wherein the electromagnetic rotor is disposed radially outwards of and coupled to the rotor carrier between the rim and the shaft; a housing, an oil pump including an oil pump shaft and an oil pump stator, wherein the oil pump shaft is coupled to the bearing, wherein the rotating assembly is configured to rotate relative to the oil pump stator, wherein the oil pump stator is coupled to the pump coupler and the housing, wherein the oil pump shaft is configured to rotate with the rotating assembly; a resolver stator, wherein the resolver stator is coupled to the housing, wherein the resolver stator is disposed radially outwards of and axially aligned with the resolver rotor; and an electromagnetic stator, wherein the electromagnetic stator is disposed radially outwards of and axially aligned with the electromagnetic rotor.

BRIEF DESCRIPTION OF THE DRAWINGS

The numerous advantages of the disclosure may be better understood by those skilled in the art by reference to the accompanying figures in which.

4

Figure 4:
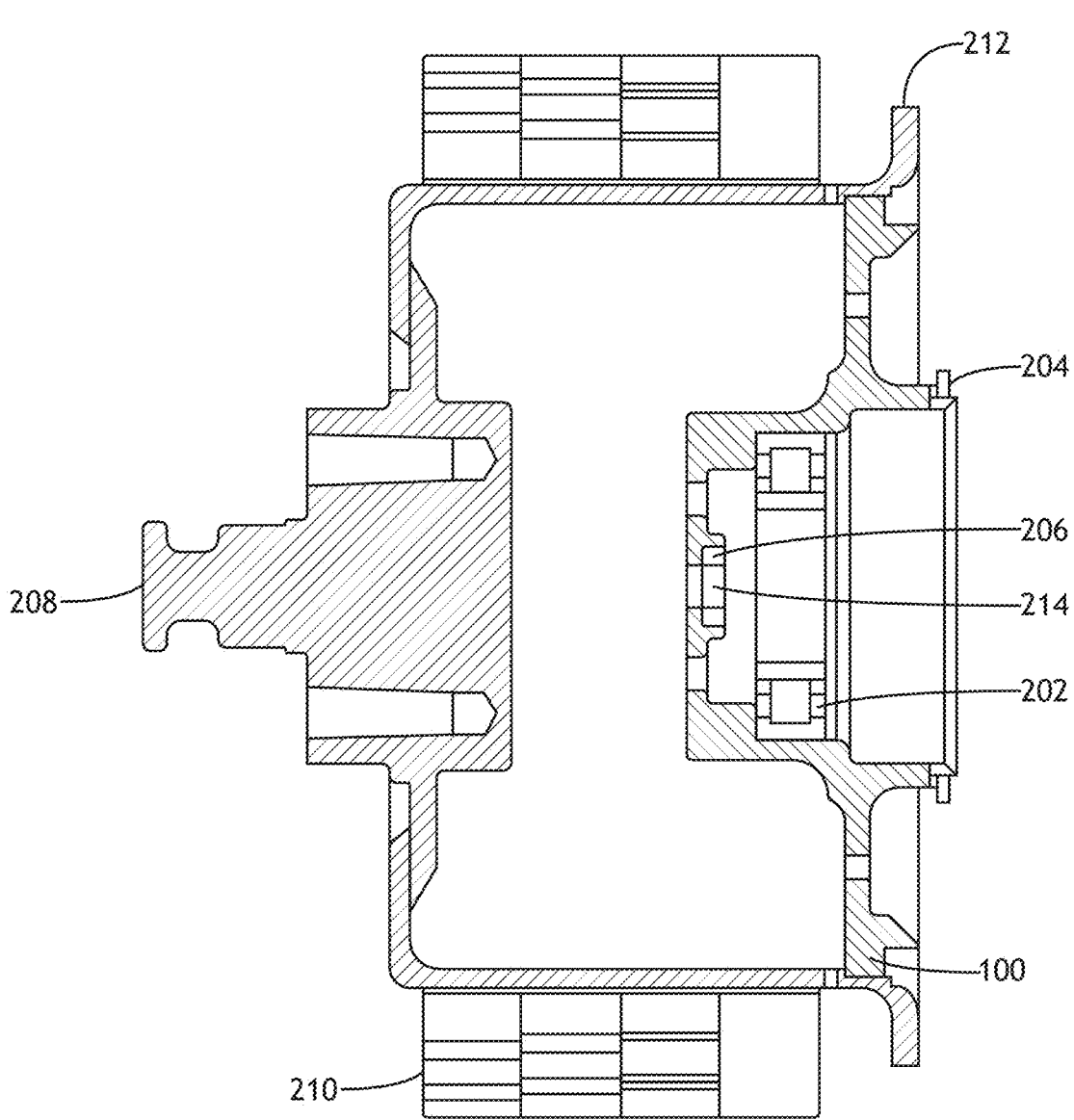

FIG. 4 depicts a cross-section view of the rotating assembly including the rotating assembly, in accordance with one or more embodiments of the present disclosure.

Figure 5:
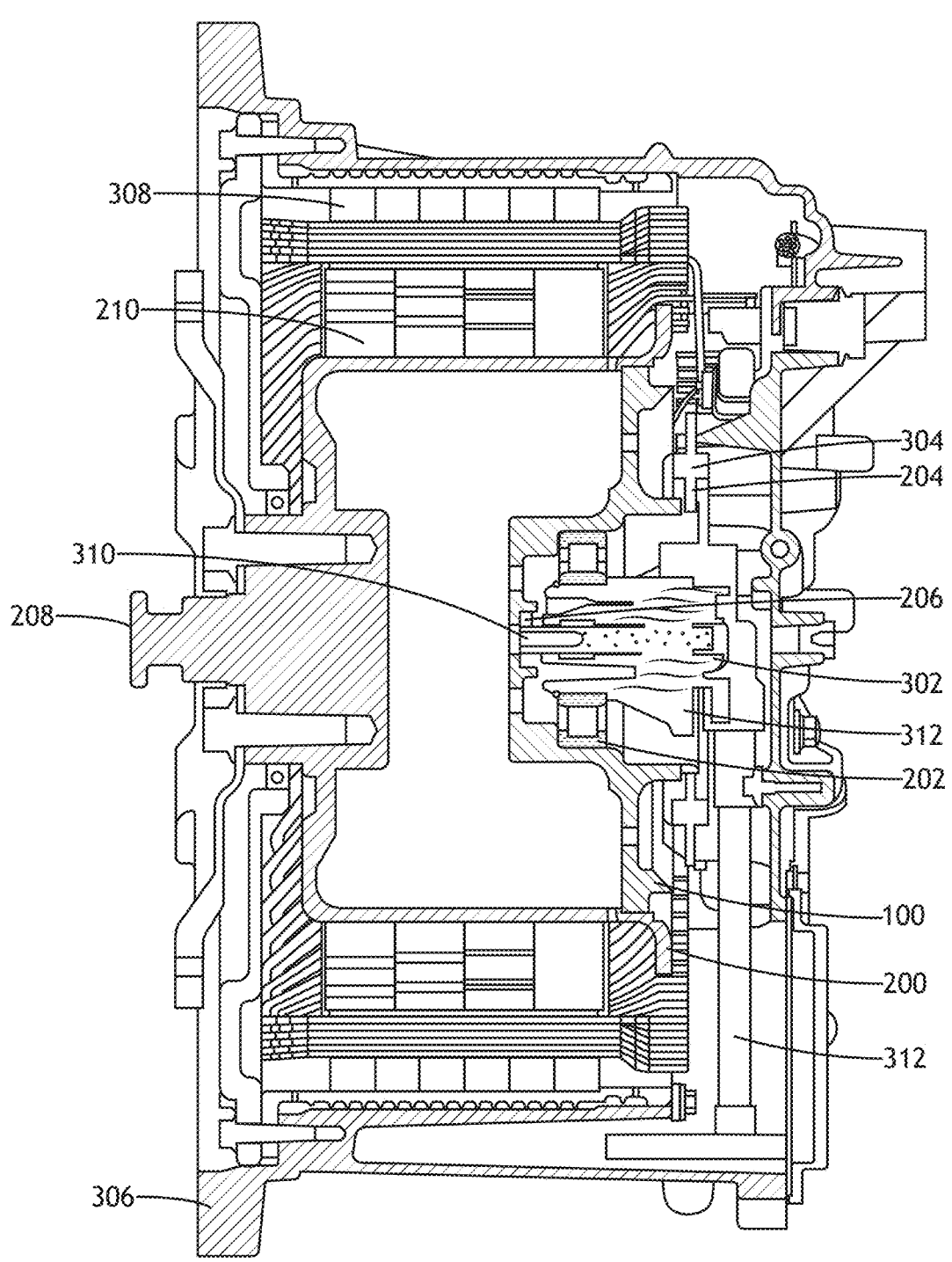

FIG. 5 depicts a cross-section view of the generator including the rotating assembly, in accordance with one or more embodiments of the present disclosure.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure are directed to a bearing carrier. The bearing carrier may include a hub defining a bearing surface. A rotating assembly may include the bearing carrier and a bearing coupled to the bearing surface. The bearing carrier may also include an annular lip extending from a flange of the hub. The rotating assembly may also include a pump coupler coupled to the annular lip of the bearing carrier. A generator may include the rotating assembly and an oil-pump coupled to the oil-pump coupler. The rotating assembly may also include an electromagnetic rotor. The generator may include an electromagnetic stator which generates electricity in response to a magnetic field induced by the electromagnetic rotor of the rotating assembly.

FIGS. 1A-1E depict a bearing carrier 100, in accordance with one or more embodiments of the present disclosure. The bearing carrier 100 may include a rim 102, a hub 104, a bearing surface 106, an external annular lip 108, an internal annular lip 110, a centered through hole 112, offset through holes 114, a flange 116, and/or slots 118. The bearing carrier 100 may not include relatively moving components. Instead, each of the components of the bearing carrier 100 may be integral.

The bearing carrier 100 may be a coupling for transmitting rotation. The bearing carrier 100 may include a central axis. The bearing carrier 100 may be configured to rotate about the central axis. A radius may refer to a distance from the central axis. A first component being radially inwards of a second component may refer to the first component being closer to the central axis of the bearing carrier 100 than the second component. A first component being radially outwards of a second component may refer to the first component being further from the central axis of the bearing carrier 100 than the second component. Axial may refer to a position along the length of the central axis.

The rim 102 may define a largest radius of the bearing carrier 100. The rim 102 may be a radially outwards-most portion of the bearing carrier 100. The rim 102 may be planar. The rim 102 may be flat along a horizontal plane. The rim 102 may be thinner than wide or long. The rim 102 may not include any significant curvature along the horizontal plane. The rim 102 may include a shape, such as, but not limited to, a circular shape. The rim 102 may include a circular cross-section.

The hub 104 may axially extend from the rim 102. The hub 104 may be disposed radially inwards of the rim 102. The hub 104 may be axially disposed between the rim 102 and the flange 116. The hub 104 may be orthogonal to the rim 102. The hub 104 may include a selected cross-section. The hub 104 may be cylindrical. For example, the hub 104 may include a hollow cylindrical cross-section along the central axis of the bearing carrier 100.

The flange 116 may extend from the hub 104. The flange 116 may be orthogonal to the hub 104. The flange 116 parallel to the rim 102. The flange 116 may be axially offset from the rim 102. For example, the flange 116 may be axially offset from the rim 102 a select height based on the height of the hub 104. The flange 116 may be planar. The flange 116 may be flat along a horizontal plane. The flange 116 may be thinner than wide or long. The flange 116 may not include any significant curvature along the horizontal plane. The flange 116 may include a shape, such as, but not limited to, a circular shape. The flange 116 may include a circular cross-section.

The flange 116 may define the centered through hole 112. The centered through hole 112 may be through the flange 116. The centered through hole 112 may be coincident with the central axis of the bearing carrier 100. For example, the central axis of the bearing carrier 100 may be the central axis of the centered through hole 112. The centered through hole 112 may be a radially inwards-most portion of the bearing carrier 100. The sides of the flange 116 defining the centered through hole 112 may be the closest surface of the bearing carrier 100 to the central axis.

The flange 116 may define offset through holes 114. The offset through holes 114 may be through the flange 116. The offset through holes 114 may be radially offset from the central axis of the bearing carrier 100. The offset through holes 114 may be disposed radially outwards of the centered through hole 112 and/or the internal annular lip 110. The offset through holes 114 may be disposed radially inwards of the rim 102, the hub 104, and/or the external annular lip 108.

The offset through holes 114 may be arranged in a planar array about the central axis. For example, the flange 116 may define eight of the offset through holes 114 arranged in the planar array about the central axis, although this is not intended to be limiting. The offset through holes 114 may be arranged in the planar array about the central axis with an equal spacing between adjacent of the offset through holes 114.

The centered through hole 112 and/or the offset through holes 114 may be circular through holes. The centered through hole 112 and/or the offset through holes 114 may include a selected radius. The offset through holes 114 may be smaller than the centered through hole 112. For example, the radius of the offset through holes 114 may be smaller than the radius of the centered through hole 112.

The hub 104 may define the bearing surface 106. An inner radius of the hub 104 may define the bearing surface 106. The bearing surface 106 may be a blind hole. For example, the bearing surface 106 may be a blind hole from the rim 102 up to the flange 116. The bearing surface 106 may be coincident with the central axis of the bearing carrier 100. For example, the central axis of the bearing carrier 100 may be the central axis of the bearing surface 106. The bearing surface 106 may be defined by the inner radius of the hub 104 which is revolved about the central axis of the bearing carrier 100.

The bearing surface 106 may be axially disposed between the flange 116 and the rim 102 and/or axially disposed between the internal annular lip 110 and the rim 102.

The bearing surface 106 may be disposed radially outwards of the internal annular lip 110, the centered through hole 112, and/or the offset through holes 114. The bearing surface 106 may be disposed radially inwards of the rim 102 and/or the external annular lip 108. The bearing surface 106 may be radially disposed between the external annular lip 108 and the offset through holes 114.

The external annular lip 108 may axially extend from the rim 102. The external annular lip 108 may axially extend from the rim 102 away from the hub 104 and/or away from the flange 116. The rim 102 may be axially disposed between the external annular lip 108 and the hub 104 and/or axially between the external annular lip 108 and the flange 116. The flange 116 and the external annular lip 108 may be axially outer-most portions of the bearing carrier 100.

The external annular lip 108 may be disposed radially inwards of the rim 102. The external annular lip 108 may be disposed radially outwards of the hub 104, the bearing surface 106, the internal annular lip 110, the centered through hole 112, the offset through holes 114, and/or the flange 116. The external annular lip 108 may be radially disposed between the rim 102 and the hub 104.

The external annular lip 108 may be coincident with the central axis of the bearing carrier 100. For example, the central axis of the bearing carrier 100 may be the central axis of the annular lip 108. The external annular lip 108 may be a lip which is revolved about the central axis of the bearing carrier 100. The external annular lip 108 may not be a continuous revolution about the central axis. The external annular lip 108 may define slots 118 such that the annular lip is not the continuous revolution about the central axis. For example, the external annular lip 108 may define a pair of the slots 118. The pair of the slots 118 may be disposed at equidistant angles.

The external annular lip 108 may define access hole 120. An inner radius of the external annular lip 108 may define the access hole 120. The access hole 120 may be through the rim 102 and/or the external annular lip 108 up to the bearing surface 106. The access hole 120 may allow accessing the bearing surface 106 from the external annular lip 108. The inner radius of the external annular lip 108 defining the access hole 120 may be larger than the inner radius of the hub 104 defining the bearing surface 106. The access hole 120 and the bearing surface 106 may jointly form a counterbore hole (as depicted) or a countersink hole (not depicted).

The internal annular lip 110 may axially extend from the flange 116 towards the rim 102. The internal annular lip 110 may be axially disposed between the flange 116 and the rim 102. The internal annular lip 110 may be disposed radially inwards of the rim 102 and/or the hub 104. The internal annular lip 110 may be considered internal in that the internal annular lip 110 may be disposed radially inwards of the hub 104. The internal annular lip 110 may be disposed radially inwards of the offset through holes 114. The internal annular lip 110 may be disposed radially outwards of the centered through hole 112. The internal annular lip 110 may be radially disposed between the centered through hole 112 and the offset through holes 114. The internal annular lip 110 may be coincident with the central axis of the bearing carrier 100. For example, the central axis of the bearing carrier 100 may be the central axis of the internal annular lip 110. The internal annular lip 110 may be a lip which is revolved about the central axis of the bearing carrier 100. An inner radius of the internal annular lip 110 may be larger than the radius of the centered through hole 112. The inner radius of the internal annular lip 110 and the centered through hole 112 may jointly form a counterbore hole.

FIGS. 2A-2D depict a rotating assembly 200, in accordance with one or more embodiments of the present disclosure. The rotating assembly 200 may include the bearing carrier 100, a bearing 202, a resolver rotor 204, a pump coupler 206, a shaft 208, an electromagnetic rotor 210, and/or a rotor carrier 212.

The bearing surface 106 may be a surface for the bearing 202. The bearing 202 may be disposed radially inwards of and coupled to the bearing surface 106. The bearing 202 may couple to an inner radius of the bearing surface 106. The bearing 202 may be coincident with the central axis of the bearing carrier 100 when coupled to the bearing surface 106. The bearing surface 106 may be accessible through the external annular lip 108 and the access hole 120 for pressing the bearing 202 into the bearing surface 106. The placement of the bearing 202 may allow for a smaller bearing and may minimize packaging issues for the resolver rotor 204.

The bearing 202 may include a cylindrical bearing, a taper roller bearing, a needle bearing, a ball bearing, a plain bearing (e.g., a bushing), or the like. For example, the bearing 202 is depicted as a plain bearing, although this is not intended to be limiting.

The external annular lip 108 may be a surface for the resolver rotor 204. The resolver rotor 204 may be disposed radially outwards of and coupled to the external annular lip 108. The resolver rotor 204 may couple to an outer radius of the external annular lip 108. The resolver rotor 204 may be coincident with the central axis of the bearing carrier 100 when coupled to the external annular lip 108.

The internal annular lip 110 may be a surface for the pump coupler 206. The pump coupler 206 may be disposed radially inwards of and coupled to the internal annular lip 110. The pump coupler 206 may couple to an inner radius of the internal annular lip 110. The pump coupler 206 may be coincident with the central axis of the bearing carrier 100 when coupled to the internal annular lip 110. The inner radius of the internal annular lip 110 may be accessible through the external annular lip 108, the rim 102, and the bearing surface 106 for pressing the pump coupler 206 into the inner radius of the inner radius of the internal annular lip 110.

The pump coupler 206 may define a through hole 214. The through hole 214 defined by the pump coupler 206 may be coincident to the central axis of the bearing carrier 100. The through hole 214 may include a shape, such as, but not limited to, a stadium profile. The stadium profile may include two flats at opposing ends of the stadium profile. For example, the stadium profile may be a rectangle with a pair of semicircles disposed at the ends of the rectangle, where the sides of the rectangle which does not include the semicircles defines the two flats. Although the through hole 214 is described as including a stadium profile, this is not intended as a limitation of the present disclosure. The through hole 214 may include any suitable shape for coupling a shaft to the pump coupler 206. For example, the through hole 214 may include, but is not limited to, the stadium profile, a D-profile, a keyed profile, a threaded profile, a splined profile, or the like.

The bearing carrier 100 may be coupled to the rotor carrier 212. The rim 102 of the bearing carrier 100 may be coupled to the rotor carrier 212. For example, the rim 102 may be disposed radially inwards of and coupled to the rotor carrier 212. The bearing carrier 100 may be coupled to the rotor carrier 212 by staking the rotor carrier 212 to the rim 102 of the bearing carrier 100. The rotor carrier 212 may be plastically deformed to stake the rotor carrier 212 to the rim 102 of the bearing carrier 100.

The rim 102, the hub 104, the bearing surface 106, the internal annular lip 110, the centered through hole 112, the offset through holes 114, and/or the flange 116 may be disposed within the rotor carrier 212. A portion of the external annular lip 108 and/or the access hole 120 may be disposed within the rotor carrier 212. A remainder of the external annular lip 108 and/or access hole 120 may be disposed axially outwards of the rotor carrier 212. The resolver rotor 204 may be disposed axially outwards of the rotor carrier 212.

The shaft 208 may be coupled to the rotor carrier 212. For example, the shaft 208 may be coupled to an axial end of the rotor carrier 212. The shaft 208 may be coincident with the central axis. The shaft 208 may rotate about the central axis. For example, the shaft 208 may be driven by an external motor or the like.

The electromagnetic rotor 210 may be disposed radially outwards of and coupled to the rotor carrier 212. For example, the electromagnetic rotor 210 may be coupled to an outer radius of the rotor carrier 212.

The rotor carrier 212 may be coincident with the central axis. The rotor carrier 212 may transfer the rotation from the shaft 208 to the electromagnetic rotor 210 such that the electromagnetic rotor 210 may rotate about the central axis. The electromagnetic rotor 210 may include one or more poles. Rotation of the electromagnetic rotor 210 about the central axis may induce a magnetic field via the poles.

The shaft 208, the electromagnetic rotor 210, and/or the bearing carrier 100 may be coupled to rotor carrier 212. The shaft 208 and the bearing carrier 100 may be coupled to opposing axial ends of the rotor carrier 212. The electromagnetic rotor 210 may be coupled to the rotor carrier 212 between the shaft 208 and the bearing carrier 100.

Rotation of the shaft 208 may cause the rotating assembly 200 to rotate via the coupling with the rotor carrier 212. The bearing carrier 100, the resolver rotor 204, the pump coupler 206, the shaft 208, the electromagnetic rotor 210, and/or the rotor carrier 212 may form a rigid body. The bearing carrier 100, the resolver rotor 204, the pump coupler 206, the shaft 208, the electromagnetic rotor 210, and/or the rotor carrier 212 may be coupled with zero degrees-of-freedom. The bearing carrier 100, the resolver rotor 204, the pump coupler 206, the shaft 208, the electromagnetic rotor 210, and/or the rotor carrier 212 may be configured to rotate as the rigid body. For example, rotation of the shaft 208 may cause rotation of the bearing carrier 100, the resolver rotor 204, the pump coupler 206, the electromagnetic rotor 210, and/or the rotor carrier 212. The shaft 208 may transmit torque to the electromagnetic rotor 210 and/or the bearing carrier 100 via the rotor carrier 212. The bearing carrier 100 may transmit the torque to the resolver rotor 204 and/or the pump coupler 206.

Figure 1A:
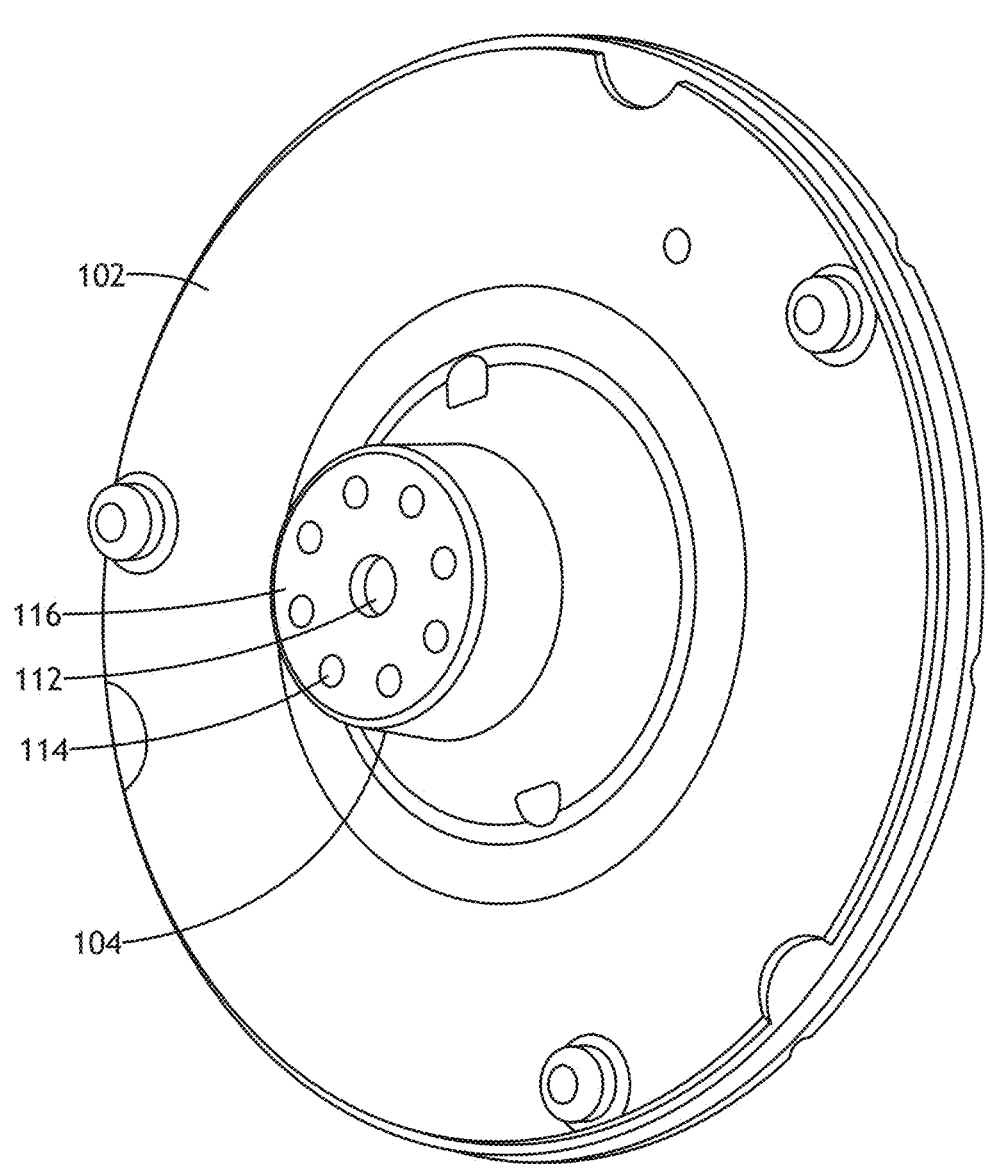
FIG. 1A depicts a front perspective view of a bearing carrier, in accordance with one or more embodiments of the present disclosure.
Figure 1B:
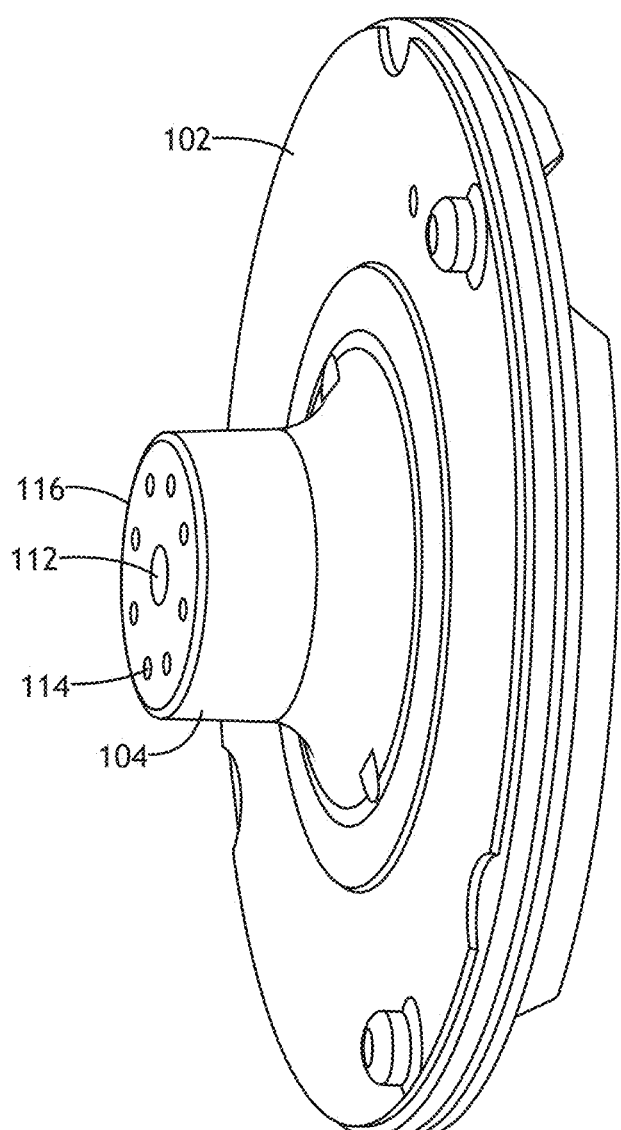
FIG. 1B depicts a side perspective view of the bearing carrier, in accordance with one or more embodiments of the present disclosure.
Figure 1C:
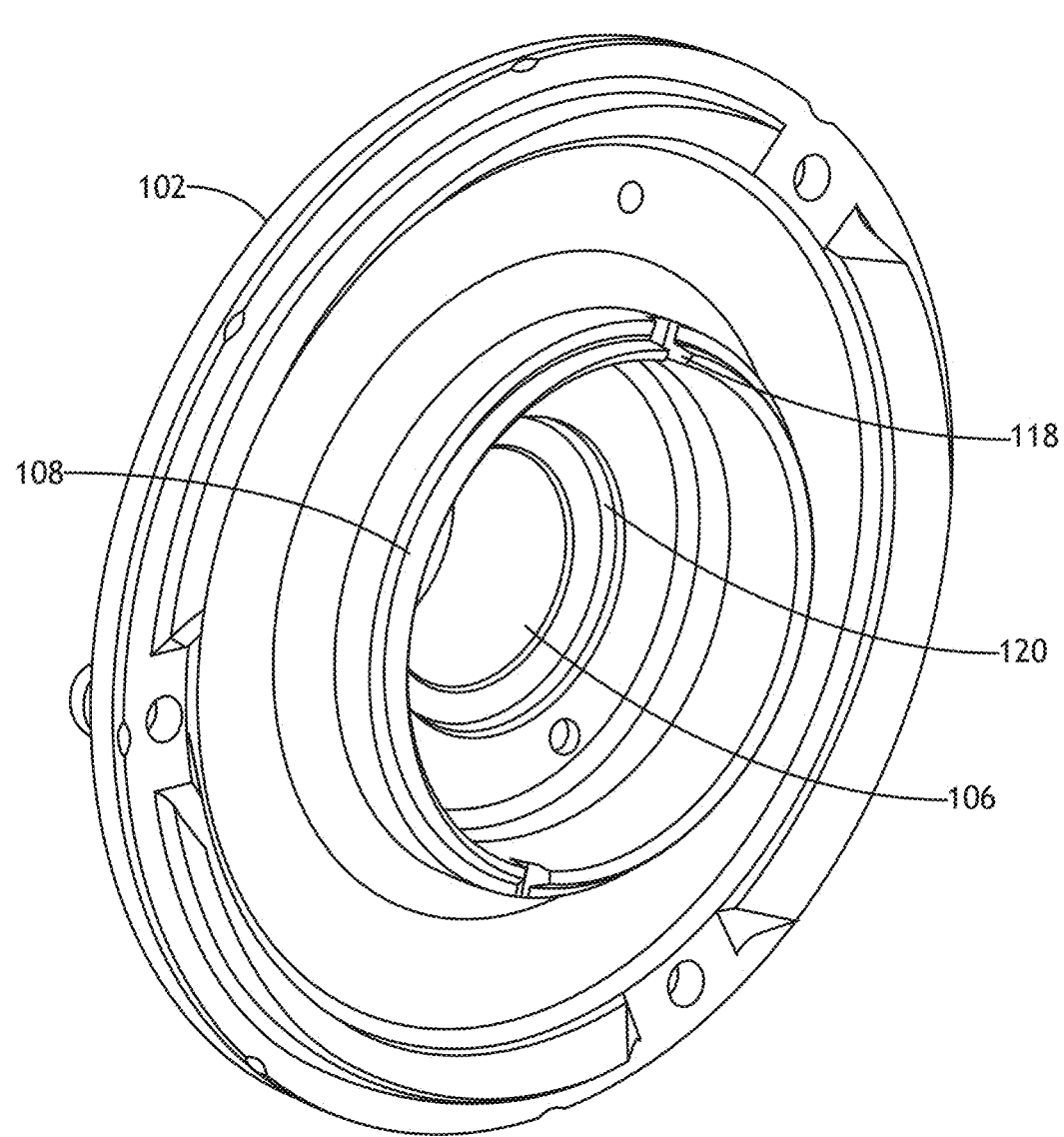
FIG. 1C depicts a rear perspective view of the bearing carrier, in accordance with one or more embodiments of the present disclosure.
Figure 1D:
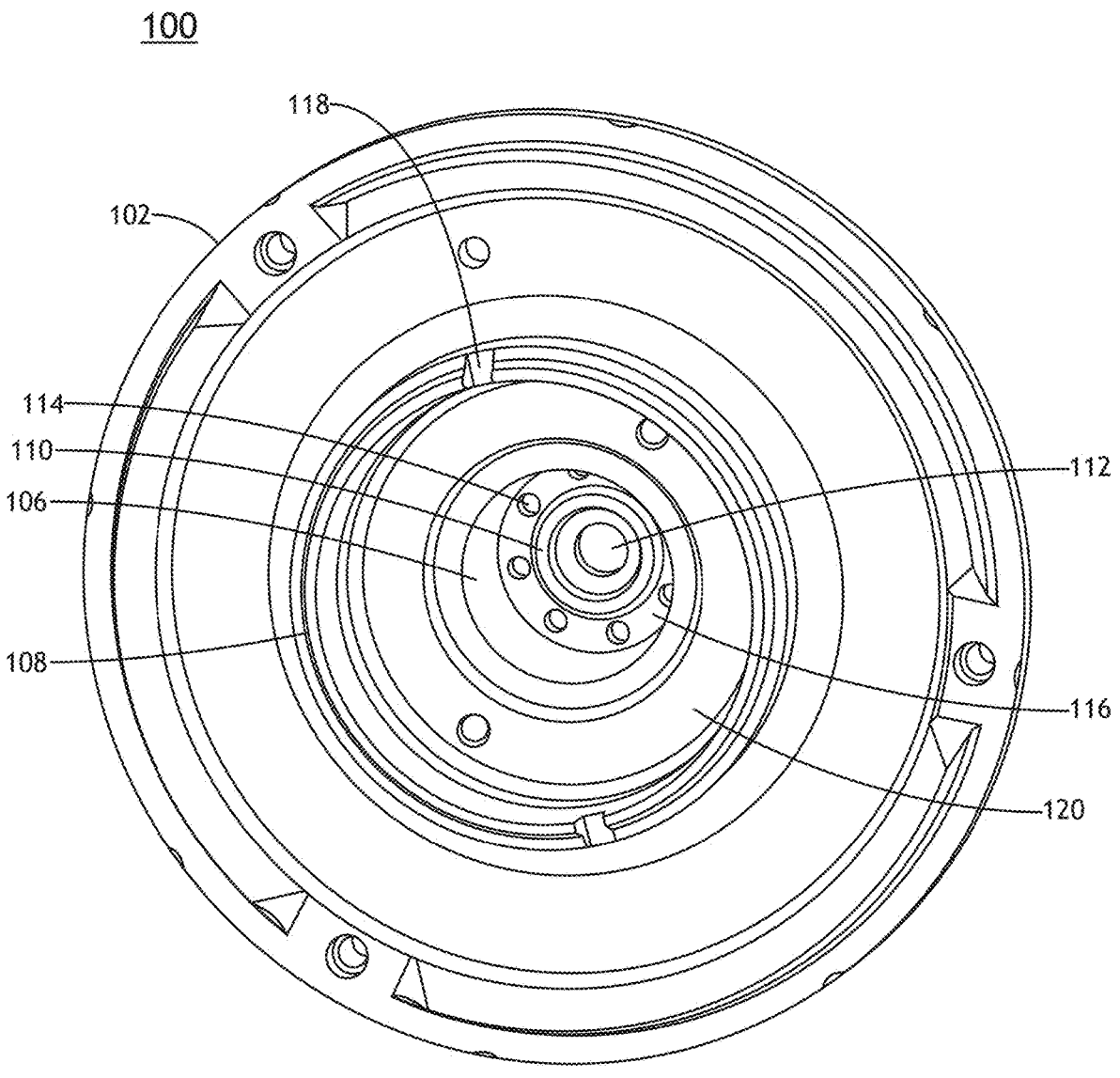
FIG. 1D depicts a rear view of the bearing carrier, in accordance with one or more embodiments of the present disclosure.
Figure 1E:
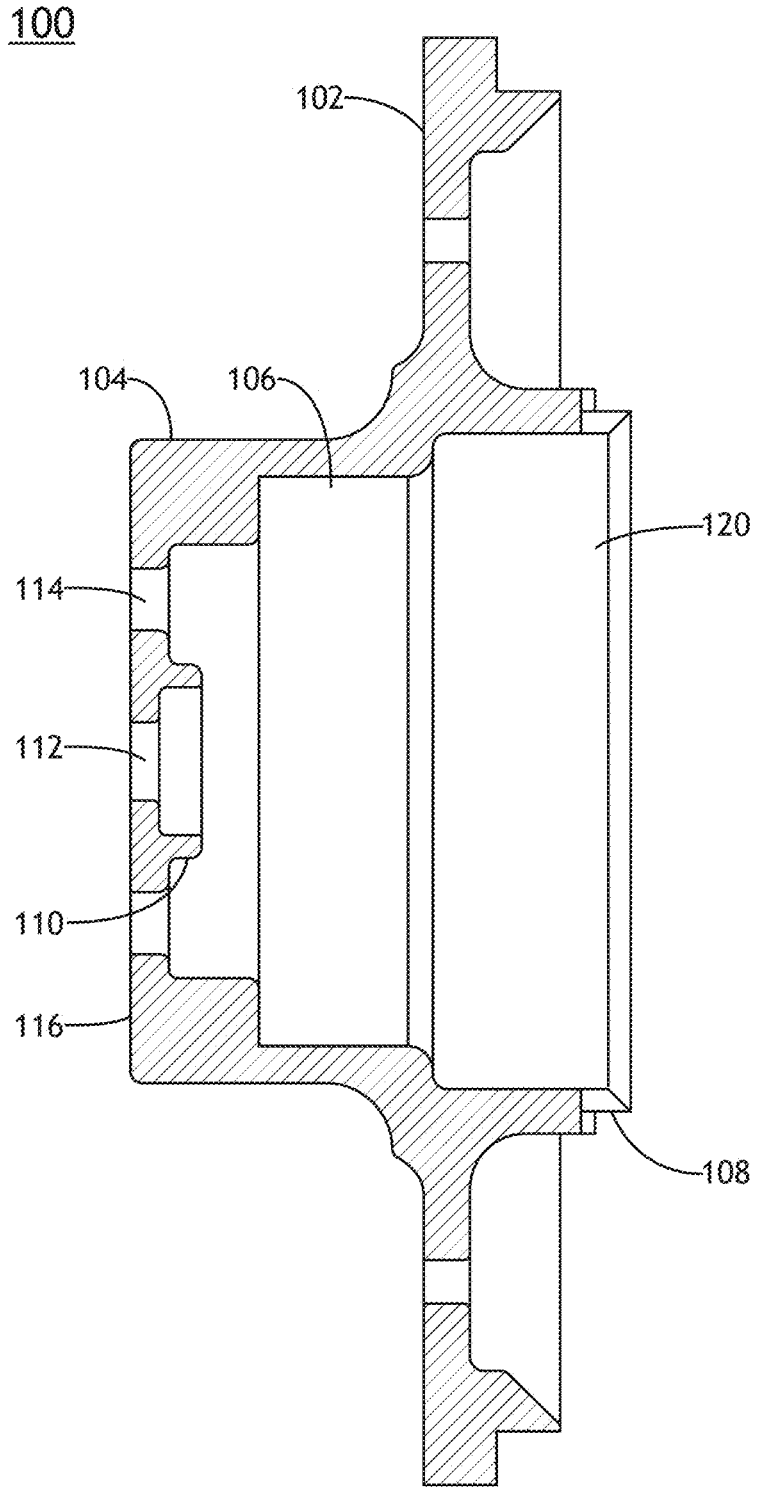
FIG. 1E depicts a cross-section view of the bearing carrier, in accordance with one or more embodiments of the present disclosure.
Figure 2A:
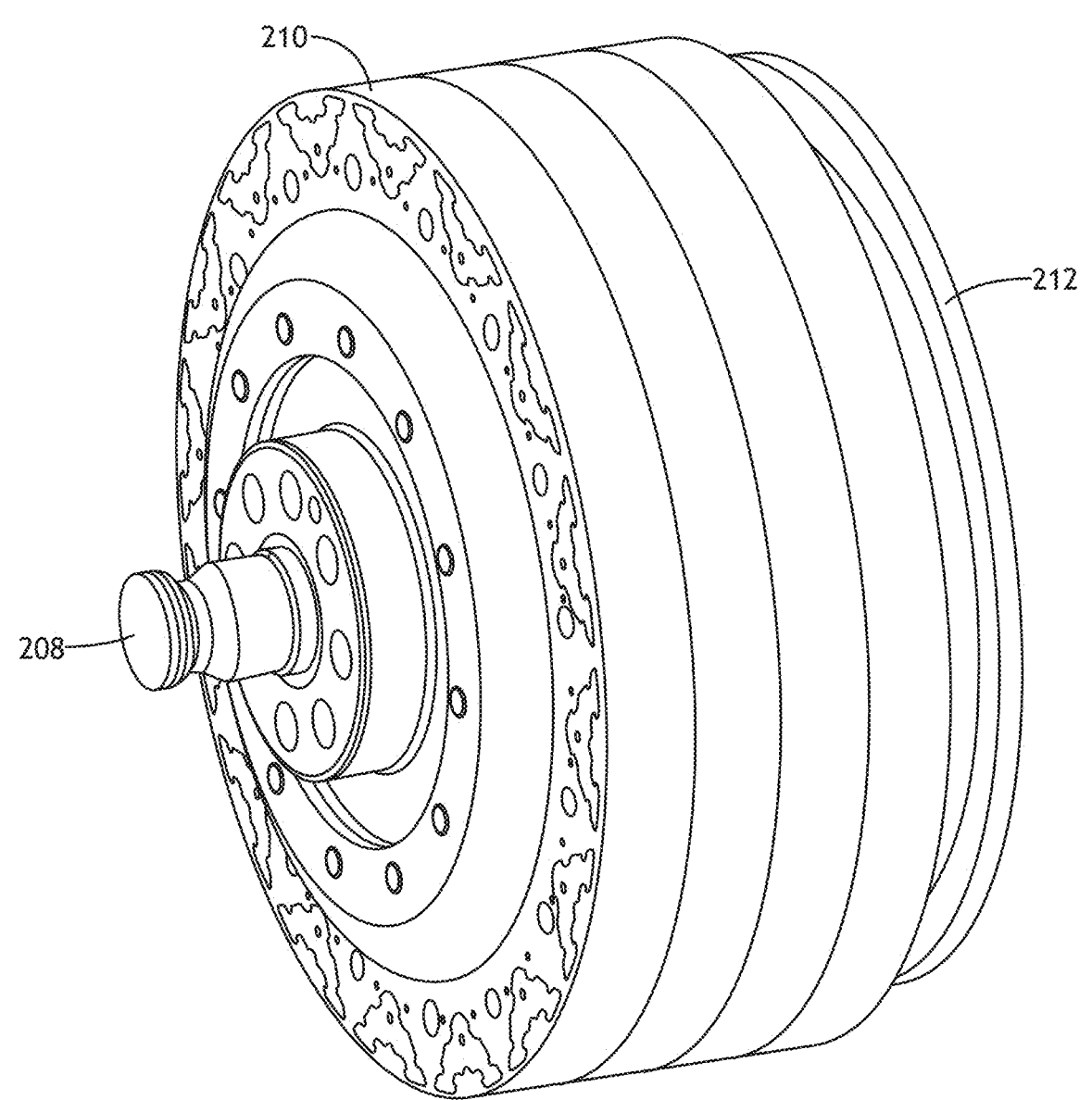
FIG. 2A depicts a front perspective view of a rotating assembly including the bearing carrier, in accordance with one or more embodiments of the present disclosure.
Figure 2B:
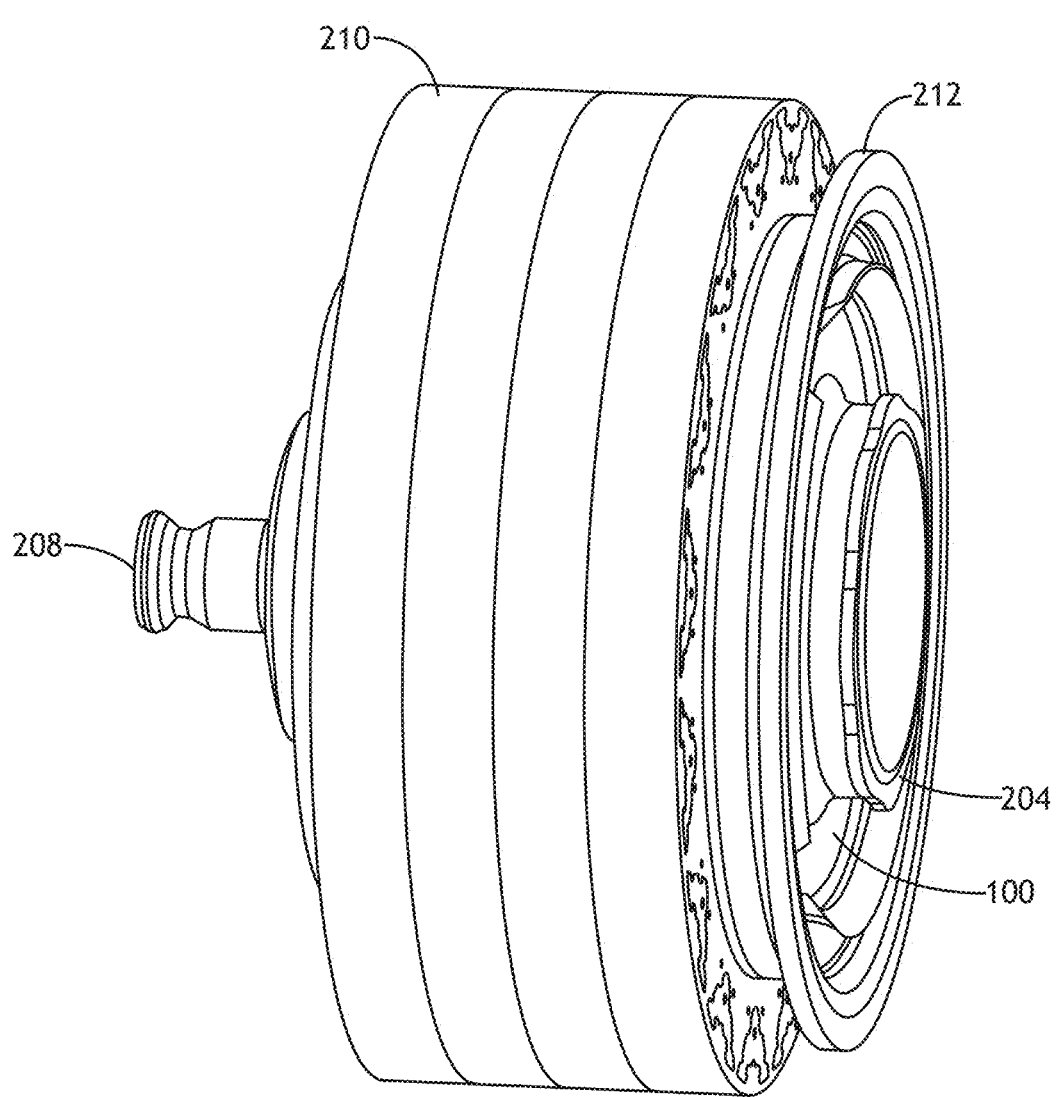
FIG. 2B depicts a rear perspective view of the rotating assembly including the bearing carrier, in accordance with one or more embodiments of the present disclosure.
Figure 2C:
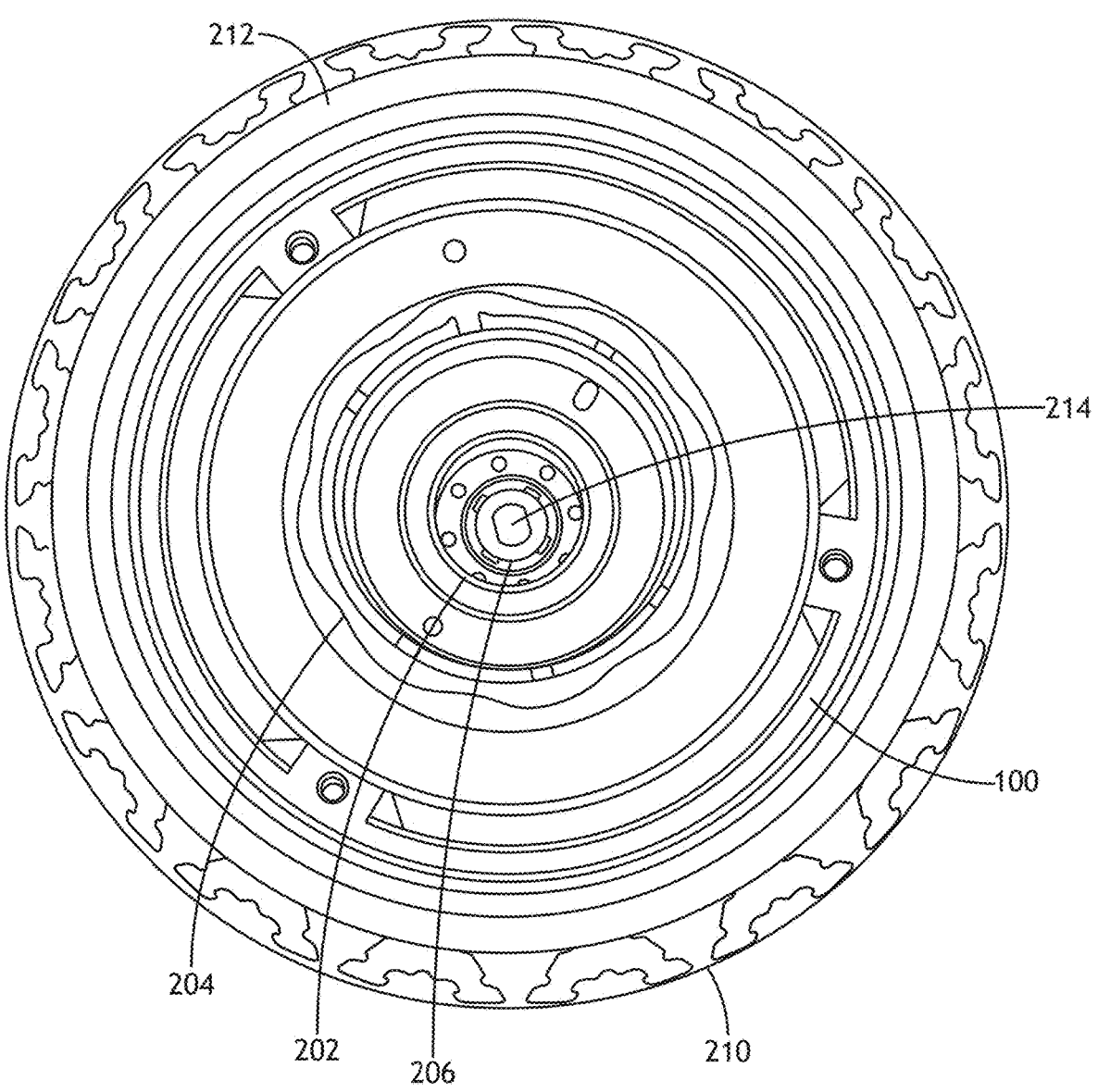
FIG. 2C depicts a rear view of the rotating assembly including the bearing carrier, in accordance with one or more embodiments of the present disclosure.
Figure 2D:
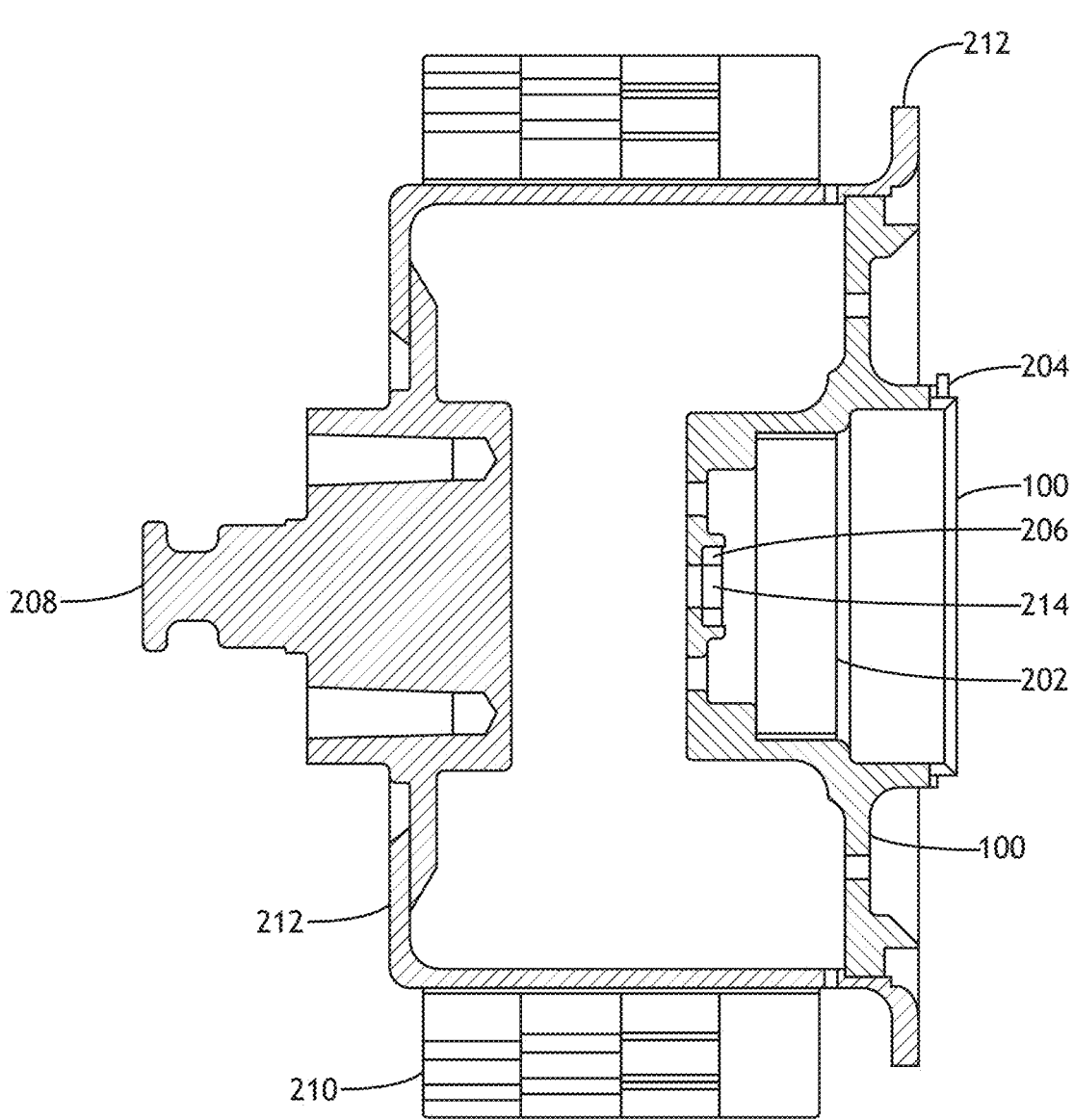
FIG. 2D depicts a cross-section view of the rotating assembly including the bearing carrier, in accordance with one or more embodiments of the present disclosure.
Figure 3:
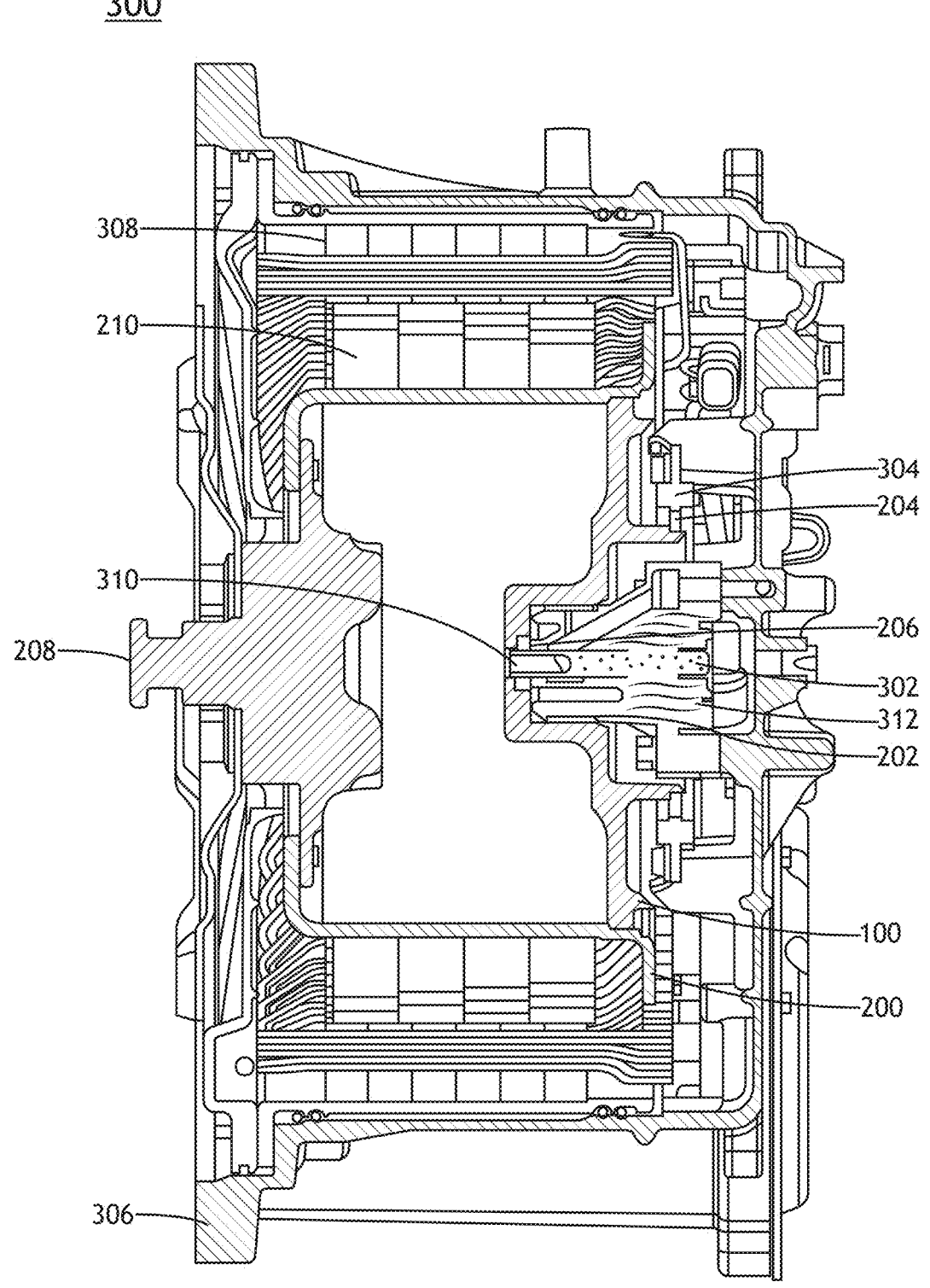
FIG. 3 depicts a cross-section view of a generator including the rotating assembly, in accordance with one or more embodiments of the present disclosure.

FIG. 3 depicts an electric motor 300, in accordance with one or more embodiments of the present disclosure. The electric motor 300 may include the rotating assembly 200, an oil pump 302, a resolver stator 304, a housing 306, and/or an electromagnetic stator 308.

The oil pump 302 may include an oil pump shaft 310 and/or an oil pump stator 314. The oil pump shaft 310 may be configured to rotate relative to the oil pump stator 314.

The oil pump 302 may be coupled to the housing 306. For example, the oil pump stator 314 coupled to the housing 306. The oil pump stator 314 and the housing 306 may be stationary and not rotate with the rotating assembly 200.

The bearing carrier 100 may be a carrier for mounting the oil pump 302. The oil pump stator 314 of the oil pump 302 may be coupled to the bearing 202. The oil pump stator 314 and the bearing surface 106 may couple to the inner radius and the outer radius, respectively, of the bearing 202. The bearing 202 may couple between the bearing carrier 100 and the oil pump stator 314. The bearing 202 may act as a bearing surface between the oil pump stator 314 and the rotating assembly 200. The rotating assembly 200 may be configured to rotate relative to the oil pump stator 314 via the bearing 202. The bearing 202 may couple between the oil pump 302 and the bearing carrier 100. The bearing 202 may locate the rotating assembly 200 relative to the oil pump stator 314. The rotating assembly 200 may provide integrated support for the oil pump stator 314 via the bearing 202 and the bearing carrier 100.

The oil pump shaft 310 may rotate with the rotating assembly 200. The oil pump shaft 310 may be coupled to the pump coupler 206. The oil pump shaft 310 may be coincident with the central axis of the bearing carrier 100 and/or the rotating assembly 200. The oil pump shaft 310 may be coupled to the pump coupler 206. For example, the oil pump shaft 310 may be coupled to the pump coupler 206 via a connection with the through hole 214. The oil pump shaft 310 may include flats which couple to the pump coupler 206. For example, the oil pump shaft 310 may be a include a pair of flats which define the stadium profile. The rotating assembly 200 may rotate the oil pump shaft 310. The pump coupler 206 may transfer rotation to the oil pump shaft 310. The oil pump 302 may be driven via the pump coupler 206. The oil pump 302 may be a power takeoff of the rotating assembly 200 and/or a mechanical oil pump driven by the rotating assembly 200. Thus, the torque from the shaft 208 may goes through the rotor carrier 212, the bearing carrier 100, and the pump coupler 206 into the oil pump shaft 310 driving the oil pump 302.

The rotation of the oil pump shaft 310 may cause oil to be pumped by the oil pump 302. The oil pump 302 may pump the oil through the central axis of the oil pump shaft 310 into the rotating assembly 200. For example, the oil pump 302 may pump the oil into the rotating assembly 200 within the rotor carrier 212 for cooling the rotating assembly 200. The offset through holes 114 may allow the oil to flow from within the rotor carrier 212 to the bearing 202 for cooling the bearing 202. The oil may return to the oil pump 302 through a pickup tube 312.

The resolver stator 304 may be disposed radially outwards of and axially aligned with the resolver rotor 204. The resolver stator 304 may be coupled to the housing 306. The resolver stator 304 may sense the rotary position of the resolver rotor 204. The resolver stator 304 may be a variable-reluctance sensor, a hall-effect, an eddy current sensor, or the like. The resolver stator 304 may provide the rotary position of the resolver rotor 204 to an inverter, a power electronics unit, or the like. The resolver stator 304 may be axially offset from the bearing 202. The resolver stator 304 may be axially aligned with a portion of the oil pump 302 and/or disposed at an opposing side of the rotating assembly 200 to the shaft 208.

The housing 306 may house the rotating assembly 200, the oil pump 302, the resolver stator 304, the electromagnetic stator 308, and/or the pickup tube 312.

The electromagnetic stator 308 may be disposed radially outwards of and axially aligned with the electromagnetic rotor 210. The electromagnetic stator 308 may include a stator core, a winding, and the like.

The electromagnetic stator 308 may be configured to generate electricity in response to the magnetic field induced by the electromagnetic rotor 210 of the rotating assembly 200. In this regard, the electric motor 300 may be configured as a generator.

Although the electric motor 300 is described as a generator, this is not intended as a limitation of the present disclosure. It is further contemplated that the electromagnetic stator 308 may induce a magnetic field in response to receiving the electricity and the electromagnetic rotor 210 may rotate the rotating assembly 200 in response to the magnetic field induced by the electromagnetic stator 308. Thus, the electric motor 300 may function as both a generator and a motor.

FIG. 4 depicts the rotating assembly 200 and FIG. 5 depicts the electric motor 300, in accordance with one or more embodiments of the present disclosure. Although the bearing 202 is described as a plain bearing, this is not intended as a limitation of the present disclosure. The bearing 202 may also be a ball bearing with an outer ring and an inner ring. The outer ring may be affixed to the bearing surface 106 and the inner ring may be affixed to the oil pump 302. It is further contemplated that the bearing 202 may be a needle bearing, or the like.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS

100 Bearing carrier
102 Rim
104 Hub
106 Bearing surface
108 External annular lip
110 Internal annular lip
112 Centered through hole
114 Offset through holes
116 Flange
118 Slots
120 Access hole
200 Rotating assembly
202 Bearing
204 Resolver rotor
206 Pump coupler
208 Shaft
210 Electromagnetic rotor
212 Rotor carrier
214 Through hole
300 Electric motor
302 Oil pump
304 Resolver stator
306 Housing
308 Electromagnetic stator
310 Oil pump shaft
312 Pickup tube
314 Oil pump stator

What is claimed:

1. A bearing carrier comprising:
a rim;
a hub, wherein the hub is disposed radially inwards of and axially extends from the rim, wherein an inner radius of the hub defines a bearing surface, wherein the bearing surface is coincident to a central axis of the bearing carrier;
a flange, wherein the flange extends from the hub, wherein the hub is axially disposed between the rim and the flange, wherein the flange defines a centered through hole, wherein the centered through hole is coincident with the central axis;
an external annular lip, wherein the external annular lip axially extends from the rim away from the hub and the flange, wherein the external annular lip is disposed radially outwards of the hub and the flange, wherein the external annular lip is coincident with the central axis; and
an internal annular lip, wherein the internal annular lip axially extends from the flange towards the rim, wherein the internal annular lip is disposed radially inwards of the hub, wherein the internal annular lip is disposed radially outwards of the centered through hole, wherein the internal annular lip is coincident with the central axis.

2. The bearing carrier of claim 1, wherein the flange is parallel to the rim.

3. The bearing carrier of claim 2, wherein the hub is cylindrical, wherein the hub is orthogonal to the rim, wherein the flange is orthogonal to the hub.

4. The bearing carrier of claim 1, wherein the centered through hole is a radially inwards-most portion of the bearing carrier, wherein the rim is a radially outwards-most portion of the bearing carrier.

5. The bearing carrier of claim 1, wherein the flange and the external annular lip are axially outer-most portions of the bearing carrier.

6. The bearing carrier of claim 1, wherein the bearing surface is axially disposed between the flange and the rim.

7. The bearing carrier of claim 6, wherein the bearing surface is axially disposed between the internal annular lip and the rim.

8. The bearing carrier of claim 1, wherein the external annular lip defines an access hole through the external annular lip and the rim up to the bearing surface.

9. The bearing carrier of claim 8, wherein the access hole and the bearing surface jointly form one of a counterbore hole or a countersink hole.

10. The bearing carrier of claim 1, wherein the flange defines a plurality of offset through holes, wherein the plurality of offset through holes are disposed radially outwards of the centered through hole.

11. The bearing carrier of claim 10, wherein the plurality of offset through holes are disposed radially outwards of the internal annular lip.

12. The bearing carrier of claim 11, wherein the bearing surface is disposed radially outwards of the internal annular lip, the centered through hole, and the plurality of offset through holes.

13. The bearing carrier of claim 12, wherein the plurality of offset through holes are arranged in a planar array about the central axis.

14. The bearing carrier of claim 12, wherein the plurality of offset through holes are smaller than the centered through hole.

15. The bearing carrier of claim 1, wherein the external annular lip defines one or more slots.

16. A rotating assembly comprising:
a bearing carrier comprising:
a rim;
a hub, wherein the hub is disposed radially inwards of and axially extends from the rim, wherein an inner radius of the hub defines a bearing surface, wherein the bearing surface is coincident to a central axis of the bearing carrier;
a flange, wherein the flange extends from the hub, wherein the hub is axially disposed between the rim and the flange, wherein the flange defines a centered through hole, wherein the centered through hole is coincident with the central axis;
an external annular lip, wherein the external annular lip axially extends from the rim away from the hub and the flange, wherein the external annular lip is disposed radially outwards of the hub and the flange, wherein the external annular lip is coincident with the central axis; and
an internal annular lip, wherein the internal annular lip axially extends from the flange towards the rim, wherein the internal annular lip is disposed radially inwards of the hub, wherein the internal annular lip is disposed radially outwards of the centered through hole, wherein the internal annular lip is coincident with the central axis;

a bearing, wherein the bearing is disposed radially inwards of and coupled to the bearing surface;

a resolver rotor, wherein the resolver rotor is disposed radially outwards of and coupled to the external annular lip;

a pump coupler, wherein the pump coupler is disposed radially inwards of and coupled to the internal annular lip;

a shaft;

an electromagnetic rotor; and a rotor carrier, wherein the rim and the shaft are coupled to opposing axial ends of the rotor carrier, wherein the electromagnetic rotor is disposed radially outwards of and coupled to the rotor carrier between the rim and the shaft.

17. The rotating assembly of claim 16, wherein the bearing is one of a cylindrical bearing, a taper roller bearing, a needle bearing, a ball bearing, or a plain bearing.

18. The rotating assembly of claim 16, wherein at least the bearing carrier, the resolver rotor, the pump coupler, the shaft, the electromagnetic rotor, and the rotor carrier form a rigid body.

19. The rotating assembly of claim 16, wherein the resolver rotor is disposed axially outwards of the rotor carrier.

20. An electric motor comprising:

a rotating assembly comprising:

a bearing carrier comprising:

a rim;

a hub, wherein the hub is disposed radially inwards of and axially extends from the rim, wherein an inner radius of the hub defines a bearing surface, wherein the bearing surface is coincident to a central axis of the bearing carrier;

a flange, wherein the flange extends from the hub, wherein the hub is axially disposed between the rim and the flange, wherein the flange defines a centered through hole, wherein the centered through hole is coincident with the central axis;

an external annular lip, wherein the external annular lip axially extends from the rim away from the hub and the flange, wherein the external annular lip is disposed radially outwards of the hub and the flange, wherein the external annular lip is coincident with the central axis; and an internal annular lip, wherein the internal annular lip axially extends from the flange towards the rim, wherein the internal annular lip is disposed radially inwards of the hub, wherein the internal annular lip is disposed radially outwards of the centered through hole, wherein the internal annular lip is coincident with the central axis;

a bearing, wherein the bearing is disposed radially inwards of and coupled to the bearing surface;

a resolver rotor, wherein the resolver rotor is disposed radially outwards of and coupled to the external annular lip;

a pump coupler, wherein the pump coupler is disposed radially inwards of and coupled to the internal annular lip;

a shaft;

an electromagnetic rotor; and a rotor carrier, wherein the rim and the shaft are coupled to opposing axial ends of the rotor carrier, wherein the electromagnetic rotor is disposed radially outwards of and coupled to the rotor carrier between the rim and the shaft;

a housing;

an oil pump comprising an oil pump shaft and an oil pump stator, wherein the oil pump shaft is coupled to the bearing, wherein the rotating assembly is configured to rotate relative to the oil pump stator, wherein the oil pump stator is coupled to the pump coupler and the housing, wherein the oil pump shaft is configured to rotate with the rotating assembly;

a resolver stator, wherein the resolver stator is coupled to the housing, wherein the resolver stator is disposed radially outwards of and axially aligned with the resolver rotor; and an electromagnetic stator, wherein the electromagnetic stator is disposed radially outwards of and axially aligned with the electromagnetic rotor.

* * * * *